UNITED STATES PATENT OFFICE.

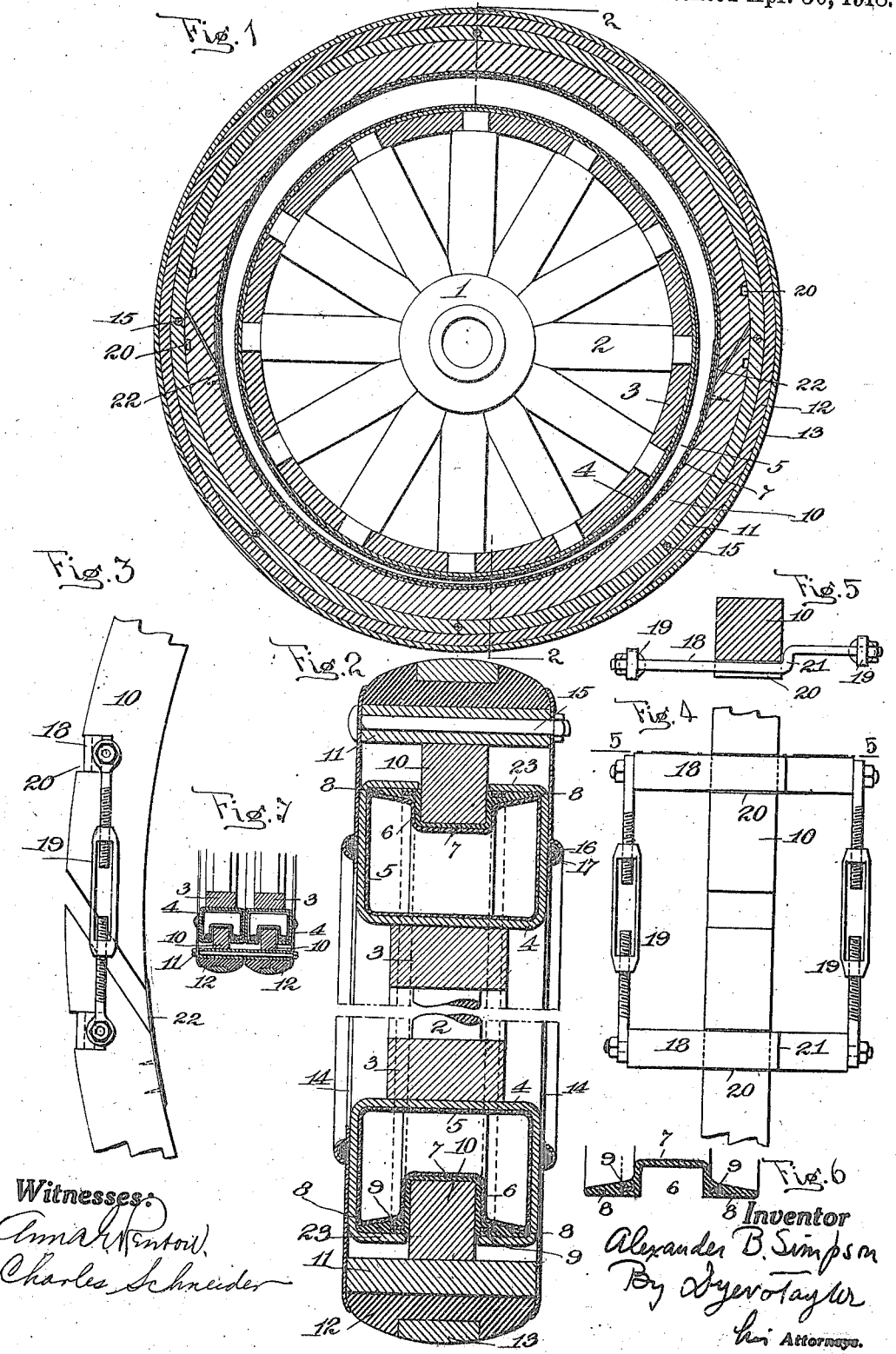

ALEXANDER B. SIMPSON, OF HOLLIS, NEW YORK.

VEHICLE-WHEEL.

1,264,696.

Specification of Letters Patent.   Patented Apr. 30, 1918.

Application filed August 19, 1915.   Serial No. 46,224.

*To all whom it may concern:*

Be it known that I, ALEXANDER B. SIMPSON, a citizen of the United States, residing at Hollis, county of Queens, State of New York, have invented a certain new and useful Improvement in Vehicle-Wheels, of which the following is a specification.

This invention relates to improvements in vehicle wheels in which there is an elastic media located between the tire and hub. The object of the invention is to prevent folding and rubbing of the walls of the pneumatic tube. Another object is to increase the resiliency of the wheel, to extend its life and to simplify its construction.

These and further objects will more fully appear from the following specification and accompanying drawings, considered together or separately.

In the drawings

Figure 1 is a section of a wheel embodying my invention;

Fig. 2 is a section at right angles to Fig. 1, said section being taken on the line 2, 2 of Fig. 1;

Fig. 3 is a side elevation of a portion of the annular piston and the means for drawing the sections thereof together;

Fig. 4 is a plan view of the structure illustrated in Fig. 3;

Fig. 5 is a section on the line 5, 5 of Fig. 4;

Fig. 6 is a section of the ring in unstretched or undistorted condition; and

Fig. 7 is a diagrammatic view of a modification.

In all of the views like parts are designated by the same reference characters.

Referring to the drawings the wheel is shown as comprising a hub 1, spokes 2 and felly 3. Such a form of wheel is chosen solely for purposes of illustration. Outside of the felly is a channel 4. This channel is provided with annular flanges 23, leaving a separating opening for the entrance of the piston about to be described. Within the channel is an elastic tube 5. This tube is adapted to be filled with compressed air introduced through a valve (not shown). The tube is placed within the channel, in deflated condition through the opening between the annular flanges. Outside of the elastic tube is a ring 6. This ring comprises an elastic trough 7 and the lateral wings 8. Preferably the whole ring is made of rubber, the trough 7 being made of gum rubber so as to be very elastic. The wings may be made of similar material or not, as desired. Associated with these rings are hoops 9. These hoops are adapted to prevent the wings from collapsing when the tire is being assembled. The external diameter of the wings is preferably slightly less than the internal diameter of the flanges 23. The ring 6 is introduced within the channel 4 through the opening between the annular flanges in the same manner that the elastic tube is introduced.

Outside of the trough 7 is an annular piston 10. This piston enters the trough and passes between the annular flanges 23. Outside of the piston is a rim 11. This rim 11 may be made of any material and is of a fixed diameter. The pistons 10 preferably engage with the rim frictionally. Outside of the rim is a shoe 12, formed of rubber or any other suitable material. If desired a suitable tread 13 may be introduced within the shoe. This tread may be made of lead, in which case it will be continuous around the wheel. It may be made of other material, and need not necessarily be continuous.

On each side of the rim is a cheek plate 14. Each cheek plate is held in place by suitable means, such as bolts 15. The outer edges of the cheek plates preferably bend toward each other, as shown in Fig. 2, so as to hold the shoe 12 in place.

For the purpose of preventing the entrance of dust and dirt into the space between the channel and the rim, suitable packing rings 16 are provided. Each ring lies within an annular recess 17 formed in the cheek plates.

The depth of the trough 7 at its bottom is such that before it is expanded its diameter is greater than the internal diameter of the piston 10. Therefore, after the piston 10 has been introduced in place the walls of the trough are stretched. In order to introduce the piston in position it is made in a number of pieces, for example two, as illustrated. Each piece is provided with a notch 20 near the joint. Suitable yokes 18 enter these notches and the ends of the yokes are brought together by turn buckles 19. Preferably the yokes are made as illustrated of material of flat cross-section, with reduced extremities for attachment to nuts and for entrance within the ends of the turn buckles. The turn buckles being screwed up, the yokes will be brought together and this will bring together the abutting ends of the sections of the piston. This will have the effect of pushing the pistons into the troughs, stretching the elastic sides and bottom of the latter. When in this position the rims may be slipped over the pistons and then the turn buckles unscrewed and the yokes removed.

In order to permit the rim to be introduced in place outside of the piston each yoke is provided with an off-set 21 so that the ends holding the turn buckles on that side will not be engaged by the rim when the latter is introduced in place. At the joint between the sections of the piston is provided a guard plate 22 so that the outward pressure on the base of the trough will not pinch the bottom of the trough between the joints of the two sections of the piston.

When the parts of the wheel are assembled, as before stated, the trough 7 will be distorted and expanded to a certain degree. When the wheel is subjected to use and strikes an obstruction the shoe and the rim will be forced upward. This will push in the portion of the piston at the bottom of the wheel and allow the portion of the piston at the top of the wheel to move upward. The effect of this will be to further distort the trough at the bottom of the wheel and allow the trough at the top of the wheel to regain, wholly or in part, its original shape. There is no possibility of the sides of the trough being pinched because they are held flat against the piston and the annular flanges by the air pressure within the elastic tube. Also, there is no possibility of the walls of the elastic tube being pinched because there are no open joints in contact therewith. If desired certain parts of the ring may be reinforced in addition to the hoops 9, 9.

Fig. 7 illustrates a modification in which a plurality of channels and pistons are employed, and a single rim. Two cheek plates are used, as shown.

A great advantage of my device is that any amount of air pressure within the tube may be employed, as may be necessary or desirable. The channel and its flanges will prevent expansion of the tube, irrespective of the pressure within it. The outward pressure on the piston is resisted by the rim 11, and the parts being in equilibrium the piston cannot be forced out by any amount of air pressure. In practice, however, I find that very little air pressure is necessary, except with very heavy loads, the air pressure being regulated in accordance with the load and the proportion of the parts.

Having now described my invention, what I claim as new and desire to secure by Letters Patent is:—

1. A vehicle wheel having an annular channel, an elastic tube within the channel, a ring, said ring having an elastic portion and engaging with the tube; an annular piston engaging the ring and holding the elastic portion under tension, and a rim carried by the piston.

2. A vehicle wheel having a circular channel, an elastic tube within the channel, a ring within the channel, said ring comprising an elastic trough and lateral wings, said trough engaging the tube, an annular piston engaging the ring and lying within the trough, and a rim carried by the piston.

3. A vehicle wheel having a felly, an annular channel outside of the felly, said channel having annular flanges; an elastic tube within the channel, a ring within the channel and engaging with the flanges, said ring comprising an elastic trough and lateral wings; hoops associated with the wings to prevent collapsing of the wings; an annular piston formed of a plurality of parts, said piston being of less diameter than the base of the trough, so that the trough is normally under tension; a rim frictionally engaging the piston and holding the parts thereof against the tension of the trough, and cheek plates on each side of the rim, a shoe surrounding the rim, said cheek plates serving to hold the shoe in position and also centering the rim on the piston.

4. A vehicle wheel having a felly, an annular channel outside of the felly, said channel having annular flanges; an elastic tube within the channel, a ring within the channel and engaging with the flanges, said ring comprising an elastic portion and inelastic lateral wings; an annular piston formed of a plurality of parts, said piston engaging the elastic portion, so that the latter is normally under tension; a rim frictionally engaging the piston and holding the parts thereof against the tension of the elastic portion, and cheek plates on each side of the rim, and a shoe surrounding the rim, said cheek plates serving to hold the shoe in position and also centering the rim on the piston.

5. A vehicle wheel having a felly, an annular channel outside of the felly, said channel having annular flanges; an elastic tube within the channel, a ring within the channel and engaging with the flanges, said ring comprising an elastic trough and lateral wings; hoops associated with the wings to prevent collapsing of the wings; an annular piston formed of a plurality of parts, each having notches for engagement with means for bringing together the contiguous parts of the piston, said piston being of less internal diameter than the base of the trough, so that the trough is normally under tension; a rim frictionally engaging the piston and holding the parts thereof against the tension of the trough; a shoe carried by the rim; and cheek plates on each side of the rim; bolts connecting the cheek plates and rim, said cheek plates serving to hold the shoe in position and also centering the rim on the piston.

6. A vehicle wheel having a felly; an annular channel outside of the felly, said channel having annular flanges; an elastic tube within the channel, a ring within the channel and engaging with the flanges, said ring comprising an elastic trough and lateral wings; hoops associated with the wings to prevent collapsing of the wings; an annular piston formed of a plurality of parts, each having notches for engagement with yokes for bringing together the contiguous parts of the piston, said piston being of less internal diameter than the base of the trough, so that the trough is normally under tension; a rim frictionally engaging the piston and holding the parts thereof against the tension of the trough; a guard plate secured to one section of the piston and having a sliding contact with the other section; a shoe carried by the rim; and cheek plates on each side of the rim; bolts connecting the cheek plates and rim, said cheek plates serving to hold the shoe in position and also centering the rim on the piston.

This specification signed and witnessed this eighteenth day of August, 1915.

ALEXANDER B. SIMPSON.

Witnesses:
ANNA E. RENTON,
JAS. F. COLEMAN.